United States Patent [19]

Brodowski et al.

[11] 4,213,890

[45] Jul. 22, 1980

[54] PREPARATION OF TEREPHTHALOYL-TEREPHTHAL/OXAL COPOLYHYDRAZIDE CONTAINING ZINC COMPOUND

[75] Inventors: Walter Brodowski, Amorbach; Michael Wallrabenstein, Worth am Main, both of Fed. Rep. of Germany

[73] Assignee: Akzona Incorporated, Asheville, N.C.

[21] Appl. No.: 948,494

[22] Filed: Oct. 4, 1978

[30] Foreign Application Priority Data

Oct. 4, 1977 [DE] Fed. Rep. of Germany ....... 2744621

[51] Int. Cl.$^2$ ................................................ C08K 3/10
[52] U.S. Cl. ............................ 260/45.75 W; 8/115.5; 525/419; 528/271; 528/363
[58] Field of Search ................. 528/363, 271; 8/115.5; 260/45.75 W; 525/419

[56] References Cited

U.S. PATENT DOCUMENTS

| | | | |
|---|---|---|---|
| 3,060,550 | 10/1962 | Smith | 8/115.5 |
| 3,607,810 | 9/1971 | Schopf et al. | 528/363 |
| 3,661,502 | 5/1972 | Meyer et al. | 8/115.5 |
| 3,748,298 | 7/1973 | Dobinson et al. | 528/363 |
| 3,847,842 | 11/1974 | Suzuki et al. | 8/115.5 |

OTHER PUBLICATIONS

Journal of Polymer Science, Pt. A, vol. 2, pp. 1825–1832 (1964).

*Primary Examiner*—Harold D. Anderson
*Attorney, Agent, or Firm*—Francis W. Young; Jack H. Hall

[57] ABSTRACT

Flame retardant films and fibers of zinc chelates of terephthaloyl-terephthalic/oxalic copolyhydrazides, the oxalic dihydrazide and terephthalic dihydrazide units having a molar ratio in the range of 19:6 to 6:19. The products aftertreated with an oxalic acid solution are colorless.

3 Claims, No Drawings

PREPARATION OF TEREPHTHALOYL-TEREPHTHAL/OXAL COPOLYHYDRAZIDE CONTAINING ZINC COMPOUND

This invention relates to zinc chelates of terephthaloylterephthal/oxal copolyhydrazide, flame resistant films and fibers from these chelates, and processes for their preparation.

Terephthaloyl-terephthal/oxal copolyhydrazides have already been described in U.S. Pat. No. 3,748,298. They are obtained by copolycondensation of terephthaloyl chloride, terephthalic acid dihydrazide and oxalic acid dihydrazide. Some metal chelates of polyisophthaloyl-isophthalhydrazide and isophthaloyl-isophthal/terephthal-copolyhydrazide are also known: A. H. Frazer and F. T. Wallenberger, Journal of Polymer Science, Part A., Vol. 2, pp. 1825-1832 (1964). With the exception of $Zn^{2+}$ and $Cd^{2+}$ chelates these products have a pronounced color, are virtually impossible to work up and dissolve only in concentrated sulfuric acid, and so only while undergoing decomposition. Films of these polyhydrazide chelates become brittle at temperatures above 350° C. and decompose. In the case of copolyhydrazide chelates, only the film chelated with mercury was found to be colorless in vacuum, but in the presence of air it discolored quickly, in U. V. light it assumed a dark gray color and decomposed. While fibers obtained from the metal chelates of these polyhydrazides or copolyhydrazides had a higher melting temperature compared to nonchelated material, their thermal stability is not improved.

New copolyhydrazide metal chelates have now been found which in terms of use characteristics are superior to the above-described compounds.

The subject matter of the invention are zinc chelates of terephthaloyl-terephthal/oxal-copolyhydrazides of a mole ratio of oxalic acid dihydrazide to terephthalic acid dihydrazide structural units ranging between 19:6 and 6:19.

The polymer substrate of the metal chelates of the invention, terephthaloyl-terephthal/oxal-copolyhydrazides in the indicated mole ratio of oxalic acid dihydrazide to terephthalic acid dihydrazide structural units are readily soluble in the polycondensation mix. using mole ratios outside the indicated range yields high viscosity gels which cannot be worked up. Fibers and films can be obtained in a known manner from these copolyhydrazides by copolycondensation of terephthaloyl chloride, terephthalic acid dihydrazide and oxalic acid dihydrazide, e.g. according to the process described in U. S. Pat. No. 3,,748,298 in N, N' dimethylacetamide/5 wt. % lithium chloride and subsequent precipitation of the polymer or molding of the polymer solution obtained in this manner. The poly- or copolyhydrazides may also be dissolved according to the process of German Pat. No. 1,694,328 in dilute aqueous alkali hydrazides and transformed to films or fibers by casting or spinning the alkaline solutions into acid precipitation baths.

The metal chelates of the invention are obtained by reaction of terephthaloyl-terephthal/oxal-copolyhydrazides with a zinc salt solution.

The copolyhydrazide may be a solid, e.g. a powder, film, fabric, or granules in which form it can be treated in an immersion bath with the solution of the zinc salt. It is also possible e.g. to spray the zinc salt solution onto the solid copolyhydrazide. It is furthermore possible to react dissolved copolyhydrazide e.g. as solution in dimethyl acetamide/LiCl or as dilute aqueous alkali hydroxide solution.

Zinc salts suitable for reaction are inorganic and organic salts. Examples are chlorides, nitrates, acetates, sulfates and formates.

Suitable for reaction with the copolyhydrazides are solutions of the zinc salts in water, in dilute aqueous bases, in organic solvents, e.g. dimethyl acetamide, n-methylpyrrolidone, dimethyl formamide, pyridine and in aliphatic amines, as well as in mixtures of cited solvents. Especially suitable are solvent mixtures of water and ammonia as well as of water and aliphtatic amines.

The zinc uptake is influenced by a number of parameters; however, process conditions which are particularly suitable for the preparation of a special copolyhydrazide chelate can be readily determined by a series of simple tests.

The following influence factors were determined:

1. The amount of zinc which can be taken up by the polymer depends, provided all other parameters are constant, to a minimal degree upon the chemical composition of the polymer.
2. Increasing the concentration of the zinc salt in the treatment bath will, for the same treatment time, increase the zinc uptake.
3. An increase in temperature will as a rule increase the rate of zinc uptake. However, in most cases zinc uptake proceeds speedily enough so that treatment of the copolyhydrazide with the zinc salt solutions is advantageously carried out at room temperature.
4. Zinc uptake is very much a function of the pH of the zinc salt solution. It increases with increasing pH. It is preferred to carry out the chelation reaction at a pH of 11-12 or higher.
5. The rate of zinc uptake is greater for high swelling polymer material. Swelling can be produced either by the solvent of the zinc salt solution and/or by another swelling agent.

A preferred treatment solution is a solution of zinc chloride in aqueous 2 N. ammonium hydroxide. The metal content of the chelates ranges from very small quantities, e.g. 0.1 wt.%, to the saturation limit.

The copolyhydrazide chelates of the invention exhibit useful properties. They are practically nonsoftening and thus relatively dimensionally stable in the presence of thermal influences. They are yellow, whereas nonchelated copolyhydrazides are white. The chelates can be molded. They represent, furthermore, valuable metallic compounds, which can be used where corresponding low molecular compounds cannot be used, e.g. because of their solubility. This is often the case with catalytic processes.

With a zinc content of at least 5 wt. %, the copolyhydrazide chelates of the invention are flame resistant and the flame resistance increases with increasing zinc content. With a zinc content of about 6 to 8 wt. % and higher, the products are even nonflammable. Based on these characteristics, the copolyhydrazide chelates of the invention are suitable for the production of film and fiber materials.

Another subject matter of the invention are zinc-containing terephthaloyl-terephthal/oxal-copolyhydrazide materials obtained by reaction of the above-described terephthaloyl-terephthal/oxal-copolyhydrazide zinc chelate with an oxalic acid solution. Solvents for oxalic acid are in particular, water and water/alcohol mixtures. The concentration of the oxalic acid solution is preferably 0.2 to 3 wt. %. The reaction is carried out at temperatures of 10° to 80° C.; reaction time is preferabl 15 to 90 minutes.

During oxalic acid treatment, the chelates are gradually de-chelated and lose their yellow color. The formerly chelate-like bonded zinc is converted to a low solubility compound which remains monodispersely distributed in the polymer.

During oxalic acid treatment, the products lose part of the zinc. With previously dried chelates as starting material, zinc loss is comparatively small, i.e. treatment with oxalic acid can be continued until the product has turned absolutely white. Dechelation progresses much more rapidly with freshly precipitated and chelated copolyhydrazides; to prevent large zinc losses, intermediate setting is recommended, i.e. brief drying of the material to be aftertreated, for instance at 40° C. in vacuum for 0.5 to 1 hours. Under these conditions, it is also possible with freshly prepared copolyhydrazide to achieve decoloration without significant zinc loss. These oxalic acid-treated products are also eminently suitable for the production of film and fiber materials. They are likewise flame-resistant or flameproof. Compared with zinc chelates, they have in addition the advantage of being white.

The flame resistant films and fibers of the above-described materials are obtained according to the invention by reacting films or fibers of terephthaloyl-terephthal/oxal copolyhydrazides having a mole ratio of oxalic acid dihydrazide to terephthalic acid dihydrazide structural units ranging from 19:6 to 6:19 with solutions of one or more inorganic or organic zinc salts, followed under cetain conditions by reaction with an oxalic acid solution. For the above-described zinc-containing terephthaloyl-terephthal/oxal copolyhydrazide materials, use is preferably made hereby of 0.2 to 3 wt. % of oxalic acid solutions, reaction temperatures of 10° to 80° C. and reaction time of 15 to 90 minutes.

The process whereby chelation is performed during the molding of a copolyhydrazide solution is less suitable for the production of chelate films and fibers, since it yields molded articles of low strength. It is therefore recommended to carry out the chelation in a separate, subsequent chelation bath.

The flame resistant or nonflammable chelated fibers obtained according to the process of the invention exhibit good textile properties. They can be processed without problems to yarns, staple fiber blend yarns, woven fabrics, knitted fabrics, nonwovens, etc. Generally, both strength and elongation data of filaments with a metal content of about 14 to 16 wt. % are only about 20% lower than those of the corresponding, nonchelated copolyhydrazide fibers. Fibers with a low metal content exhibit strengths and elongations which are only slightly lower than those of the corresponding nonchelated copolyhydrazide fibers. Dry strengths of up to 30 centinewtons/tex and dry elongations to 20% were obtained for flameproof copolyhydrazide chelate fibers.

Since it is highly desirable to obtain the flame-resistant and, under certain conditions, flame-proof zinc chelate films and fibers in a white form, the process variant, whereby chelated films or fibers are aftertreated with a solution of oxalic acid, is a preferred version of the invention process. The resulting films and fibers exhibit likewise very good, in some cases, better textile properties than products not receiving such aftertreatment, especially in terms of flame resistance.

Compared with known polyhydrazide or copolyhydrazide chelates, the products of the invention are distinguished by their flame resistance, their good physical properties as well as by their relatively light coloration.

EXAMPLE 1

Dissolve in a 2 liter plane ground reaction vessel 50 grams dried lithium chloride and 1 liter anhydrous dimethyl acetamide. Add to the solution 0.15 mole (17.7 gram) oxalic acid hydrazide and 0.05 mole (9.75 g) terephthalic acid hydrazide. After cooling the solution to 273° K., add under vigorous stirring 0.2 mole (40.6 g) terephthaloyl chloride in powder form. After 15 minutes, the cooling bath is removed and the reaction solution is allowed to heat up gradually to room temperature. After 1 hour, the hydrochloride resulting from the polycondensation is partially neutralized with 10 g LiOH.H$_2$O in 5 ml water, the reaction mass which has become highly viscous is converted after stirring for 12-16 hours into a homogeneous, high viscocity solution. Copolyhydrazide content is 5%. Inherent viscosity is 6.5 (0.5 gram/dl DMA+5% LiCl at 298° K.). The solution was subsequently poured into water. The precipitated copolyhydrazide was washed with alcohol and dried.

Subsequently, the copolyhydrazide was reacted at room temperature (22° C.) with an aqueous zinc chloride solution, which had previously been adjusted to pH 12 with aqueous ammonia. After 3, 6 and 18 hours, respectively, the copolyhydrazide had taken up 12, 18.1 and 18.8 wt. % zinc.

EXAMPLES 2 to 4

According to the above-described method, three different terephthaloyl-terephthal/oxal copolyhydrazides were prepared from 50 mole % terephthaloyl chloride as well as from oxalic acid dihydrazide and terephthalic acid dihydrazide in a molar ratio of

38:12 (I)
25:25 (II)
12:38 (III)

and treated for 18 hours with the zinc chloride solution.

As shown in the following table, the metal uptake depends only to a minor extent upon the composition of the copolyhydrazide.

| Example No. | Copolyhydrazide | Zinc Content (wt. %) |
|---|---|---|
| 2 | I | 21.1 |
| 3 | II | 18.8 |
| 4 | III | 18.8 |

EXAMPLE 5

A 5% polycondensation solution obtained according to Example 1 from 50 mole % terephthaloyl-terephthal hydrazide and 50 mole % terephthaloyl-oxal hydrazide structural units in dimethyl acetamide/lithium chloride of an inherent polymer viscosity of 8 is deaerated under vacuum and used as spinning solution. The polymer solution is spun through a spinneret with 24 orifices, each having a diameter of 250 microns, into distilled water at a draw off rate of 35 meter/min. without drawing. The filaments are washed on a spool in a pressure wash. The running yarn is dried in heated air about 643° K. Draw off rate is 15 m/min. The dried filaments have a denier of 210–218 dtex, strength of 26.5 cN/tex and an elongation of 16%.

leads to a loss of metal and as a rule causes the LOI to decline somewhat.

| Example No. | Copoly-hydrazide | Chelate | Zn Chelate Knit | | | Aftertreated Knit | | |
|---|---|---|---|---|---|---|---|---|
| | | | Zinc wt. % | LOI | Burning Test | Zinc wt.% | LOI | Burning Test |
| 6 (control) | I | — | 0 | 22–23 | — | | | |
| 7 | I | Zn | 21 | 36 | + | 14.2 | 37 | + |
| 8 (control) | II | — | 0 | 22 | — | | | |
| 9 | II | Zn | 16.7 | 34 | + | 11.5 | 31 | + |
| 10 (control) | III | — | 0 | 21 | — | | | |
| 11 | III | Zn | 14.7 | 33 | + | 7.5 | 28 | + |

The dry copolyhydrazide filaments were knitted and chelated. Chelation is accomplished at room temperature in 1 molar aqueous zinc chloride solution adjusted to pH 12 with ammonia. After treatment for 6 hours in the chelation bath, the knitted material is removed and washed with ample distilled water to neutral reaction of the wash water. Zinc content of the knit is 18.3%.

The air-dried knit is then aftertreated in a solution of 1% oxalic acid in water/methanol 1:1 for about 1 hour until the fabirc has become colorless. After repeated washing with water, the knit is dried at 313°–323° K. in the circulating air oven. The colorless knit material has a zinc content of 15.6%.

EXAMPLES 6 TO 11

To characterize the flame behavior of zinc compounds according to the invention, copolyhydrazides of examples 2 to 4 were prepared according to the method described in example 1, then as described in example 5 spun, knitted, and chelated. Part of the knit material was aftertreated with a 1 wt. % aqueous oxalic acid solution at 40° C. Untreated and aftertreated specimens were subjected to the LOI test.

The LOI (Limiting Oxygen Index) is defined as the oxygen content (in %) of an oxygen-nitrogen mixture in which a vertical specimen ignited at the top will just burn. The LOI was measured according to ASTM-D 2863 making use of a measuring instrument manufactured by Stanton Redcroft, England.

Furthermore, the knit materials were subjected to the burning test according to DIN 53 906 (vertical method).

For control, a nonchelated copolyhydrazide knit material was also tested.

The results are compiled in the following table. In the column "burning test" the plus sign indicates that the specimen did not ignite after being exposed for 15 seconds to a flame. The minus sign indicates that within this time the samples ignited and gradually burned. The degree of flame resistance of these specimens can be derived from the listed LOI values.

It follows from the table that according to the LOI test the three untreated copolymer knits are not significantly different in burning behavior. Chelation significantly increases the flame resistance of the knits. Aftertreatment of the chelated knits to achieve a white color

EXAMPLE 12

A polycondensation solution of 25 mole % oxalic hydrazide, 25 mole % terephthalic hydrazide and 50 mole % terephthaloyl chloride in dimethyl acetamide/LiCl of a polymer content of 5.5% is deaerated under vacuum. The high viscosity copolymer solution is evenly applied with a spreader onto glass plates to a thickness of 0.25 mm. After drying for 5 hours in a vacuum drying oven at 348° K. and 0.18 bar, the film is stripped under water from the glass plate. The film is dried for 2 hours at room temperature in a metal frame; the film is then introduced into a 10% zinc chloride solution adjusted with ammonia to pH 12. After 1.5 hours the film is washed with distilled water, mounted in a metal frame and dried in the vacuum drying oven. The result is a transparent yellow film having a zinc content of 21%.

By way of aftertreatment, the zinc chelated film is dried for only one hour at 313°–348° K. and subsequently treated in a bath with 1% oxalic acid solution at 333° K. (about 10 minutes), until the film has become colorless. The film is washed with distilled water to neutral reaction of the wash water and then dried in a frame in the vacuum drying oven. The result is a colorless film with a zinc content of 18%.

We claim:

1. A process for the production of a flame resistant film or fiber, comprising reacting a film or fiber of a terephthaloyl-terephthal/oxal copolyhydrazide having a mole ratio of oxalic acid dihydrazide to terephthalic acid dihydrazide structural units ranging between 19:6 and 6:19 with a solution of one or more inorganic or organic zinc salts to produce the metal chelate of said copolyhydrazide film or fiber and thereafter reacting and dechelating said metal chelate film or fiber with a solution of oxalic acid to obtain a low solubility zinc compound containing copolyhydrazide film or fiber.

2. The process of claim 1 wherein said solution of zinc salts comprises zinc chloride in aqueous ammonium hydroxide.

3. The process of claim 1 wherein the concentration of said oxalic acid solution is from 0.2 to 3 weight % and said reaction with oxalic acid is carried out at a temperature in the range of 10° to 80° C. for 10 to 90 minutes.

* * * * *